US012634983B2

(12) United States Patent
Dayi et al.

(10) Patent No.: US 12,634,983 B2
(45) Date of Patent: May 19, 2026

(54) TRAINING SYSTEM AND METHOD FOR MACHINE LEARNING BASED PRACH RECEIVER

(71) Applicant: Ulak Haberlesme A.S., Ankara (TR)

(72) Inventors: Abdurrahman Burak Dayi, Ankara (TR); Desdina Kof, Ankara (TR); Seyhan Civanlar, Istanbul (TR)

(73) Assignee: Ulak Haberlesme A.S., Ankara (TR)

( * ) Notice: Subject to any disclaimer, the term of this patent is extended or adjusted under 35 U.S.C. 154(b) by 522 days.

(21) Appl. No.: 18/132,987

(22) Filed: Apr. 11, 2023

(65) Prior Publication Data

US 2023/0337276 A1    Oct. 19, 2023

Related U.S. Application Data

(60) Provisional application No. 63/331,872, filed on Apr. 17, 2022.

(51) Int. Cl.
*H04W 74/02*    (2009.01)

(52) U.S. Cl.
CPC .................................. *H04W 74/02* (2013.01)

(58) Field of Classification Search
CPC .... H04W 74/02; H04W 24/02; G06N 3/0442; G06N 3/08
See application file for complete search history.

(56) References Cited

U.S. PATENT DOCUMENTS

| | | | | |
|---|---|---|---|---|
| 2022/0190883 A1* | 6/2022 | Kaya | .................... | H04B 7/0695 |
| 2022/0217781 A1* | 7/2022 | Decarreau | ............. | H04W 24/02 |

| | | | | |
|---|---|---|---|---|
| 2023/0198604 A1* | 6/2023 | Bhamri | .................. | H04B 7/088 |
| | | | | 375/347 |
| 2023/0217541 A1* | 7/2023 | Venkata | ................ | H04W 76/15 |
| | | | | 370/328 |
| 2023/0325706 A1* | 10/2023 | Kesavareddigari | .... | H04B 7/088 |
| | | | | 706/12 |
| 2024/0039799 A1* | 2/2024 | Parichehrehteroujeni | .................... | |
| | | | | H04B 17/3913 |

FOREIGN PATENT DOCUMENTS

| | | |
|---|---|---|
| WO | 2020234507 A1 | 11/2020 |
| WO | 2021215995 A1 | 10/2021 |

OTHER PUBLICATIONS

Davide Magrin, et al., Enabling LTE RACH Collision Multiplicity Detection via Machine Learning.
Haoran Sun, et al., Deep Learning Based Preamble Detection and TOA Estimation, IEEE, 2019.
3GPP TS 38.211, 3rd Generation Partnership Project; Technical Specification Group Radio Access Network; NR; Physical channels and modulation (Release 15), 2017, pp. 1-10.

* cited by examiner

*Primary Examiner* — Tonia L Dollinger
(74) *Attorney, Agent, or Firm* — Bayramoglu Law Offices LLC

(57)    ABSTRACT

A receiver of a Base Station (BS) uses a Machine Learning (ML) engine for random access preamble detection. The ML engine is trained from time to time wherein one of the triggers for retraining is a plurality of User Equipment (UE) sending a message to the base station, according to an aspect of this invention, that is indicative of poor preamble detection performance, upon which the BS collects controlled preamble detection dataset by selecting and engaging a group of so-called trainer-UEs. The retraining is performed by using both aforementioned controlled as well as normal preamble detection operations.

15 Claims, 15 Drawing Sheets

Input
PRACH Antenna
Signals

300

ML Engine

Output
Preamble Status/Info
To Upper Layers

TRAINING SYSTEM AND METHOD FOR MACHINE LEARNING BASED PRACH RECEIVER

CROSS REFERENCE TO THE RELATED APPLICATIONS

This application claims priority to provisional application 63/331,872, filed on Apr. 17, 2022, the entire content of which is incorporated herein by reference.

TECHNICAL FIELD

The present invention relates generally to wireless networks and more particularly to methods and components for a receiver within a base station of cellular networks that are LTE and beyond for random access preamble processing.

BACKGROUND

Any discussion of the prior art throughout the specification should in no way be considered as an admission that such prior art is widely known or forms part of common general knowledge in the field.

Key Words

5G, Base Station, New Radio, NR, Random Access, RA, Preamble, Physical Random Access Channel, PRACH, Contention-Based Random Access, CBRA, Cyclic Prefix, Zadoff-Chu, Machine Learning, Artificial Neural Network, Recursive Neural Network.

ACRONYMS AND DEFINITIONS

AI Artificial Intelligence
ANN Artificial Neural Network
BS Base Station
CBRA Contention-Based Random Access
CFRA Contention-Free Random Access
CP Cyclical Prefix
DB Database
DFT Discreet Fourier Transform
DL Downlink
IFFT Inverse Fast Fourier Transform
IoT Internet of Things
FFT Fast Fourier Transform
ML Machine Learning
PDP Power Delay Profile
PDCCH Physical Downlink Control Channel
PDSCH Physical Downlink Shared Channel
PRACH Physical Random Access Channel
PUCCH Physical Uplink Control Channel
PUSCH Physical Uplink Shared Channel
RA Random Access
RNN Recursive Neural Network
RRC Radio Resource Control
RTT Round Trip Delay
SI System Information
SNR Signal to Noise Ratio
UE User Equipment
UL Uplink
ZC Zadoff-Chu

BRIEF DESCRIPTION

Random access (RA) procedure specified for LTE and 5G cellular networks is generally used by a User Equipment (UE) to request an uplink (UL) channel access (time-frequency resource) when it has data to transmit to the base station (BS), and/or to achieve time synchronization with the BS. A random access (RA) request is generated in the form of a 'preamble' on the dedicated Uplink (UL) Physical Random Access Channel (PRACH). The BS informs all UEs via the broadcast channel the System Information (SI) about which time-frequency resource to use for PRACH.

PRACH is multiplexed with other uplink channels such as Physical Uplink Shared and Physical Uplink Control Channels (PUSCH and PUCCH, respectively) in time and frequency. The base station can re-allocate PRACH time-frequency resources from time-to-time within the PUSCH region. The random access process allows the uplink resources to be allocated to the requesting UE as well as determining the round trip time (RTT) between that UE and the BS to estimate the expected delay of received signals on uplink.

There are two different modes for random access, namely Contention-Based Random Access (CBRA) and Contention-Free Random Access (CFRA). In CBRA, the UE randomly selects a preamble from a pool of preambles shared with all other UEs in that cell. The RA transmission (also referred to as the "preamble") can collide with random access transmissions from some other UEs attempting at the same time to access the same UL network resource by choosing the same preamble. For some special random-access scenarios (e.g., handovers), the BS has the option of preventing contention by assigning a unique preamble to a UE, resulting in contention-free random access (CFRA) generally used for rapid resource allocation for time-critical uses. CFRA requires the network to reserve preambles and corresponding PRACH UL time and frequency resources, which may be inefficient. For CFRA, the UE is configured with the UL PRACH resource and preamble to use to perform random access (RA) procedure. Therefore, the BS listens to a specific PRACH time-frequency radio channel for each CFRA preamble assigned. For CBRA, however the UE must select a preamble from a group of preambles and identify the time and frequency resources on the UL to transmit that preamble based on the results of signal quality measurements.

Only 64 preambles are available for LTE and 5G in each base station (BS), which must be partitioned between CBRA and CFRA usage. If at any time more than 64 UEs in a cell simultaneously try to access PRACH, collision becomes inevitable.

A UE attempts RA procedure for reasons other than requesting UL resources to send data to BS such as (i) initial access from Radio Resource Control (RRC) IDLE state, (ii) for RRC connection re-establishment procedure; and (iii) during handover. Therefore, RA is a frequently used and highly important procedure of a cellular network, and effective preamble detection for that reason is paramount.

In prior art, the base station uses a threshold based approach to detect a preamble by comparing the peak value of the circular cross-correlation between the preamble signal and a reference signal against a preconfigured threshold value. A preamble is detected when the resultant peak value is above that threshold. The goal is to set this threshold low enough to detect the preamble but high enough to avoid false-alarm probability due to noise or interference. There is a different threshold value used per preamble. Therefore, when the cell profile changes (i.e., major SNR change or UE population and location changes), the BS must re-estimate the new threshold value for each preamble.

In theory, when two UEs originate the same preamble at the same time and send to the BS, these preambles may arrive at the BS with different delays when UEs are at different distances away from the BS. In this scenario, the BS can detect both preambles using the threshold method, notice the collision and may decide to avoid sending a response to force the UEs to reinitiate the process with different preambles. However, in real-life, i.e., when the cell size is small, or the UEs are geographically clustered together as in urban areas, or the preamble timing is configured according to cell size, the collision is unavoidable. When there is collision, the base station sends a random access response (RAR) on the broadcast downlink channel in response to a detected preamble, both UEs sending the same preamble will receive that RAR, deduce that they are given access to the same UL resource, and go to the next step by sending a message known as 'message 3' on that UL resource. The contention resolution then occurs at next step when the BS sends a message addressed directly to only one of the two UE's ID. This whole process wastes significant uplink channel bandwidth and must be avoided as much as possible.

As the number of UEs reach large numbers, the collision becomes more frequent and finally leads to PRACH congestion. The UEs end up transmitting preambles repeatedly until the maximum allowed number of preamble transmissions is reached. Even when the UEs finally manage to successfully complete the RA procedure, the access delay may still be unacceptable. The congestion will block most of the RA attempts from UEs even if the uplink has lots of unused radio resource and leads to an under-utilized network.

Some useful CBRA measurements can be collected in real-time and even stored by the higher layers such as successfully detected preamble signals and the corresponding identified preambles. Furthermore, cell profile information is regularly collected by the BS over time to observe cell profile changes. The base station can adjust the allocation of preambles between CBRA and CFRA, adjust the preamble detection threshold, and modify key preamble parameters to improve process performance.

Technical Problem

Optimization of the random-access process is imperative to improve the system performance of the cellular network. A poorly performing random access may result in frequent CBRA collisions, low preamble-detection probability, and reduced bandwidth for actual data transmission because of flood of RA messages both on UL and broadcast DL. The amount of UL resources reserved for PRACH is usually limited. Therefore, BS must improve successful preamble detection considering factors such as the random-access traffic load, uplink transmission quality and interference, traffic patterns, channel noise level, BS antenna configurations, and UE population size and/or density in cell's coverage. This task becomes even more complicated as these factors change dynamically.

The threshold based detection is simple but known to suffer from being ineffective when the number of UEs in a cell increases. Furthermore, the adjustment of the threshold value according to changing cell profiles must be repeated for each preamble which requires a significant amount of computation.

The base stations are designed to handle over hundreds of RA attempts on PRACH per second. However, forecasts indicate that RA traffic in 5G cellular networks could reach much larger number of attempts (many hundreds per second) soon, mainly due to the expected increase of the Machine-to-Machine Internet of Thing (IoT) traffic that sends frequent and periodic UL data. With so much UL channel usage requests, PRACH overload will naturally be generated and will become a serious issue.

The PRACH channel usage in 5G (and beyond) must be better optimized with better preamble detection techniques under additive channel noise and cross-channel traffic. Based on discussions, an object of the present invention devised to improve the performance of the PRACH by providing a superior preamble detection.

Technical Solution

Embodiments of the present disclosure provide specific improvements to the base station receiver in a wireless communication network such as facilitating solutions to overcome the problems summarized above and described in more detail below. More specifically, exemplary embodiments of the present disclosure aim at addressing these and other issues associated with random access performance in cellular networks specifically, for LTE and beyond, and other similar radio networks by a new technique whereby an artificial intelligence (AI) or machine learning (ML) based algorithm that has a set of tunable parameters enables optimized and/or improved random access preamble detection for CBRA and CFRA, reduced undetected collisions and false alarm instances. What is grossly lacking in prior art is how and when the ML engine training will be triggered when the PRACH performance deteriorates since the undetected or falsely detected preamble information is only visible to the affected UEs (and not to the BS). In one embodiment, the affected UE that has repeated random access failures (which causes significant random access delays) informs the BS through a simple message that the PRACH performance is not sufficient. A group of UEs is then selected as so-called trainer-UEs to which BS sends training CFRA configuration and the UL PRACH resource to send the preamble to gather collision-free controlled preamble data simply for generating a reliable training dataset. The ML algorithm is trained using random access dataset gathered by the BS using both controlled and normal preamble RA data.

There are few references in prior art on applying a Machine Learning engine within a PRACH receiver for optimizing some aspects of the PRACH process. For example, in patent application WO2020234507A1 dated 26 Nov. 2020, each UE in the cell logs its random-access procedure data and submits the logs in the form of a report to the BS, upon request. Collected UE reports are then used by an ML engine to adjust PRACH's time-frequency resources to reduce PRACH radio network costs.

In patent application, WO2021215995A1 dated 28 Oct. 2021 an ML engine is trained by a dataset of measurements of received UL and DL signals, and used to determine the output parameters for UE's PRACH configuration to attain a better PRACH performance. These configuration parameters are UE's power levels for an initial transmission of the preamble, measurement thresholds corresponding to the power levels, power ramping steps for retransmissions of the preamble, and maximum number of preamble retransmissions before declaring random access failure. There are a few recent academic references (see Magrin et. al, and Sun et. al.) providing encouraging results wherein a ML engine is used solely for improved preamble detection.

However, none of these references provide a system and method for an improved preamble detection through an ML engine by using an intelligent ML engine trainer wherein the training trigger comes directly from the UEs that experience poor PRACH performance. The method according to this invention requires only a simple message from affected UE experiencing poor PRACH performance. This eliminates the need for the UE to send large RA log files as specified in WO2020234507A1 or the BS to guess the PRACH performance based on limited data. Doing so, the embodiments of this invention address significant number of UEs that are simple IoT devices such as sensors and cameras that have very limited memory and processing power to store and send such RA log files. Once the BS determines to retrain the ML engine based on the received indication from a plurality of UEs, it may also assign CFRA to a group of trainer-UEs to collect meaningful, reliable, and controlled training dataset. Additionally, the BS uses as part of the training dataset uncontrolled (normal) successful preamble detection data that is processed in real-time or locally stored.

The methods described here are used by the Machine Learning (ML) engine, whose training is triggered and repeated under different recorded channel performance, traffic conditions and different number of UEs that enables quick and highly reliable preamble detection during random access. By doing so, the PRACH and uplink capacity are used more efficiently because unnecessary RA transmissions due to lack of collision detection are greatly reduced. This further saves the UE battery life as unnecessary preamble retransmissions at ramped power conditions are deemed unnecessary.

The ML engine is a live system and most logically placed on the receiver subsystem of a base station or a Distributed Unit (DU) component where radio signals from antennas are directly received while the ML training engine is most logically placed on a Central Unit (CU) component of a base station, or on yet another component of the base station that has sufficient memory and processor (a computer) where information on live and past RA traffic is processed and stored. The ML engine takes the role of detecting the existence of a preamble (according to step 1 of CBRA procedure) on PRACH, and hence operates on live UE traffic transmitted to the BS in real-time.

Each RA preamble sample sequence or a processed version is the input to the ML engine wherein the output of the ML engine is whether the sequence is a preamble or not (binary), and if yes, the preamble index and RTT. The ML engine operates on all preambles using a single set of ML engine parameters.

The ML training engine can be implemented either on the same processor with the ML engine or on a separate processor. The ML training engine takes the role of reoptimizing the ML engine parameters from time to time using RA measurements collected by the base station, and hence can perform training in non-real-time.

There are many possible ML engine implementations in prior art. One of them is Artificial Neural Network (ANN), wherein the ML engine parameters are simply a list of parameters used by the linear or non-linear function of neurons/nodes at neural network layers. Each online ML training dataset entry includes input values and corresponding output values (labels) pertaining preamble detection, wherein these values together are used to determine the ML engine parameters.

The online ML engine training and test datasets are collected by the base station and includes one or more of the following input values: time-domain radio signals directly received from the antenna, power delay profiles of received preambles, or any other form of processed signals obtained between the physical layer subblocks of the BS receiver. The input dataset obtained during a period of time can be categorized according to other relevant information such as estimated Signal to Noise Ratio (SNR) of the PRACH, and the cell profile, i.e., the number and location information for UEs operating in the cell at the time of dataset collection.

The online ML training dataset when collected using the 'controlled' method according to invention, the base station may require a plurality of trainer-UEs to conduct a controlled CFRA process such that the BS knows exactly the ID of the preamble sent by the UE on a specific time-frequency PRACH resource. The dataset contains at least the received preamble signal (or a processed version of it) and the corresponding preamble ID.

The base station sets aside (reserves) a single CFRA preamble that is not assigned to any UE. The BS listens to the corresponding reserved time-frequency PRACH resource to receive channel noise only.

The online ML training dataset may also be collected by a network simulator that models PRACH transmission over realistic channel conditions and number of UEs. In yet another embodiment, the online ML training dataset may be collected using a field trial wherein a small set of UE behavior is controlled. These methods are used for the initial power up of the ML engine before any live RA traffic is processed.

A training triggering subsystem activates dataset collection from live random access traffic on PRACH until a training cycle is deemed completed. In one embodiment, the ML engine training triggering subsystem initiates a training cycle under exemplary cases of (i) significant change in cell profile, (ii) missed collisions and false alarms over a time-period exceeding a threshold detected by failed CFRA attempts; and (iii) UEs explicitly reporting unsatisfactory RA performance by sending a message according to an aspect of this invention.

Advantageous Effects

According to the embodiment of the present invention, the new radio base stations have resident ML engines which can be programmed for preamble detection without adding new hardware to the system. Furthermore, the dataset required to train the ML engine can be collected by the upper layer functions of the base station. In terms of complexity, the ML engine requires more computation (number of multiplications and additions) per preamble detection than the prior art threshold method, but the ML-engine training can be performed offline. However, the complexity burden of the embodiments is on the base station whose hardware and software capabilities are constantly improving and typically has very little computational and energy restrictions. Furthermore, the ML engine uses one set of parameters for all preambles as opposed to a different threshold value per preamble according to prior art that requires more computation for each threshold determination/update cycle.

It will be appreciated by persons skilled in art that the effects that could be achieved with present invention are not limited to what has been particularly described here. Other advantages can be clearly understood from the following detailed description.

SUMMARY

The first embodiment of the invention is a triggering method of the trainer of a Machine Learning engine that is deployed within the receiver of a base station of a radio access network (RAN) that is receiving contention-based random access preamble signals or a processed version of said signals over a Physical Random Access Channel (PRACH) from a plurality of User Equipment and determining whether there is a preamble from said received signals, and a plurality of User Equipment having their random access request detection failed, and that has been directly reporting to BS using a message that causes triggering of retraining by the ML engine trainer having the steps of (a) Receiving by the base station a message from a plurality of User Equipment that the PRACH random access failed, (b) Triggering a training cycle by the trainer of a Machine Learning engine for training dataset collection.

The second embodiment is a method for selecting by the BS a subset (or group) of said plurality of User Equipment of the first embodiment that are in idle state as trainer-UEs, generating a message to each trainer-UE to initiate training using a training CFRA preamble configuration and a PRACH radio resource to send said preamble to the base station for training purposes only. Each trainer-UE receives a different training CFRA configuration, or a group of trainer-UE receives the same training CFRA preamble.

The third embodiment is a method for selecting by the BS a subset (or group) of said plurality of User Equipment of the first embodiment, step a., as trainer-UEs, generating a message to each trainer-UE to initiate training using a training CFRA preamble and a PRACH radio resource to send said preamble to the base station for training purposes only. Each trainer-UE receives a different training CFRA configuration or a group of trainer-UE of claim 1 receives the same training CFRA preamble.

The fourth embodiment of the invention produces a controlled training dataset with a plurality of data, each data having a training CFRA preamble signal, or a processed version of the CFRA preamble signal, received by the ML engine of the base station receiver and a label of correctly identified preamble, undetected preamble or false alarm based on preamble detection status.

The fifth embodiment of the invention is a trainer system for a Machine Learning engine deployed within the receiver of a base station of a radio access network (RAN) that is receiving contention-based random access preamble signals or a processed version of said signals over a Physical Random Access Channel (PRACH) from a plurality of User Equipment, determining whether there is a preamble from said received signals, and a plurality of User Equipment having their random access request detection failed, and that has been directly reporting to BS using messaging that causes of triggering of retraining by the trainer having the components of: (a) A triggering subsystem that triggers a new training cycle using controlled and normal random access preamble detection dataset. (b) A data collection subsystem that collects and stores random access preamble detection dataset. (c) An ML engine trainer that generates new optimal ML engine parameters using collected random access preamble dataset and a neural network topology. (d) An updater subsystem that updates the ML engine parameters according to new parameters determined through training.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF THE EMBODIMENTS

Figure 1:
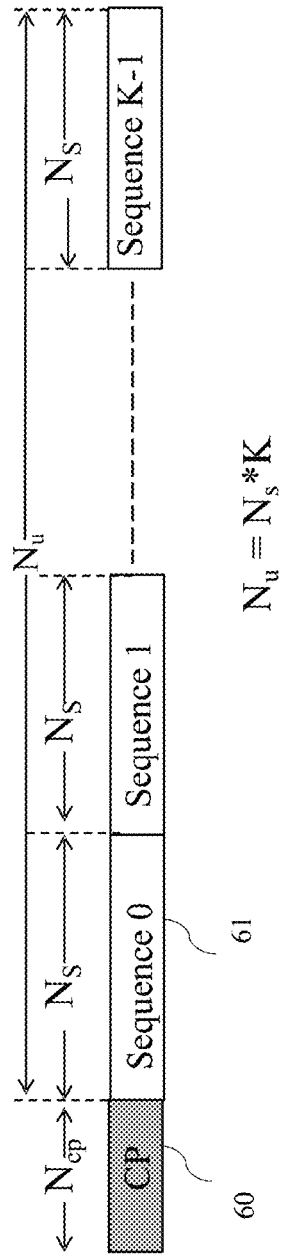
FIG. 1 illustrates the preamble format according to prior art.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The base station has many more components than those described in this disclosure. Those components are omitted so that the invention is easy to understand. Furthermore, other parts of a new generation wireless networks such as the data plane and control plane of the core network are also omitted as those parts are not relevant to invention.

Functionalities according to several embodiments of this invention are grouped as receiver functions of a base stations for simplicity, wherein in another embodiment of this invention some functionalities may belong to subsystems of the base station other than the receiver.

The preamble transmitted over PRACH is known in prior art as the Zadoff-Chu (ZC) sequence which has useful properties as a preamble. The ZC sequences are generated using a 'root sequence index', u, and 'sequence length', $L_{RA}$, as parameters using the following equation:

$$x_u(n) = e^{-j\frac{\pi u n(n+1)}{L_{RA}}}, n = 0, 1, \ldots, L_{RA} - 1$$

The 5G standards allow $L_{RA}$ values as prime numbers 139, 571, 839, and 1151. Inspecting the above equation, all ZC sequences have the same constant amplitude and is periodic with a period of $L_{RA}$; meaning for any integer k $$x_u(n) = x_u(n + k \cdot L_{RA})$$

The circular auto-correlation of the ZC sequence is zero. The circular auto-correlation of the ZC sequence with a k-delayed version of itself is however non-zero and constant only at the kth sample:

$$R_{x_u(n-k)x_u(n)}(m) = \frac{1}{L_{RA}} \sum_{n=0}^{L_{RA}-1} x_u(n-k+m)x_u^*(n) = \begin{cases} 1 & m = k \\ 0 & \text{otherwise} \end{cases}$$

This is a useful property to estimate round trip time (RTT) delay between the BS and the UE to calculate an accurate timing. Finally, the circular cross-correlation of any two different ZC sequences (generated using different root sequence indices but the same sequence length $L_{RA}$) is constant and very low (equal to $1/\sqrt{L_{RA}}$) and shrinking as the sequence length $L_{RA}$ gets longer.

The ZC sequence corresponding to a preamble is generated with a root sequence index, sequence length, and by simply cyclical shifting on the root sequence by a defined number of samples. The BS configures the available preambles for a UE as follows: The BS assigns a root sequence index (defined in TS 38.211) and a configuration index to all UEs from which they can infer the sequence length $L_{RA}$. The BS also indicates the number of samples by which the root sequence would be shifted to reach any of the 64 preambles.

Unfortunately, only a subset of cyclic shifts is possible to generate different preambles, where the number of possible cyclic shifts that retain preamble orthogonality depends on the maximum uncertainty in receive timing, which, in turn, depends on the cell size. If 64 preambles cannot be generated using a single root sequence index, that is, if sufficiently many cyclic shifts are not feasible, additional preambles are generated from cyclic shifts of the next root sequence index and so on until the required up to 64 preambles are generated.

Preamble formats define the sequence length ($L_{RA}$), subcarrier spacing of the PRACH signal ($\Delta f^{RA}$), number of repetitions of the sequence and the cyclic prefix (CP) lengths. The BS may decide to assign UEs different preamble formats for different transmission conditions by simply changing the root sequence index and sequence length ($L_{RA}$).

The preamble consists of a Cyclical Prefix (CP) of length $$N_{CP}^{RA},$$

followed by K sequence repetitions each of length $N_s$ samples of ZC, with a total sequence length of $N_u$ samples and with K≥1 at subcarrier spacing $\Delta f^{RA}$ as illustrated in FIG. 1 followed by a Guard Time (GT).

CP is well-known in prior art as the repetition of last samples of preamble sequence in time-domain and its length changes depending on the preamble format. The function of CP is to prevent data loss resulting from multipath propagation. The entire sequence including the CP is considered as the preamble. The function of GT is to prevent interference that occurs between the preamble and successive UL transmission.

The resource allocation to PRACH in time-frequency domain is defined by the BS and communicated to each UE with a higher layer parameter. The starting frequency domain location for PRACH transmission is defined by the BS. The number of resource blocks occupied by PRACH samples can be calculated as a function of preamble subcarrier spacing $\Delta f^{RA}$ and common uplink channel subcarrier spacing on which the PRACH transmission occurs.

Figure 2A:
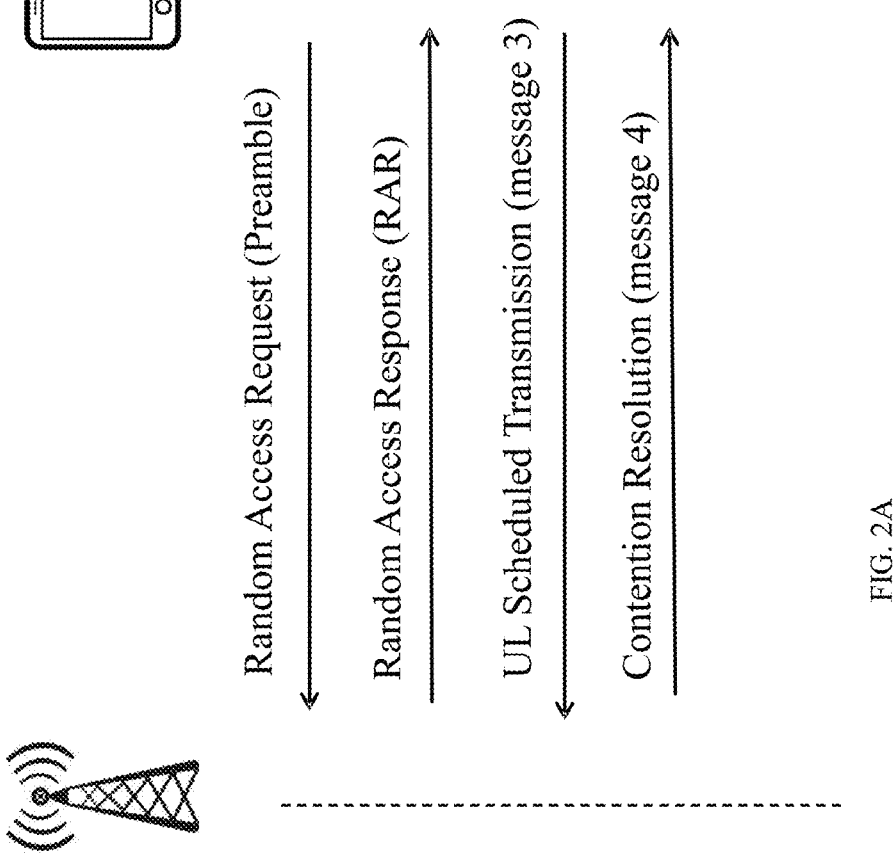
FIG. 2A, 2B show the CBRA and CFRA procedure steps, respectively, according to prior art.

FIG. 2A illustrates the four-step process in an exemplary CBRA procedure that is summarized as follows:

Step 1 (Random Access Preamble): The UE randomly selects one random-access preamble (or sequence) from a known set of preambles indicated by the BS via broadcast System Information (SI). The purpose of random preamble selection is to avoid collision by separating the preambles in a code domain. Even so, a random preamble selection may result in more than one UE to simultaneously choose and transmit the same preamble (i.e., requesting the same UL resources from the BS), leading to a need for a subsequent repeated contention resolution process. When the number of UEs transmitting the preamble at the same time is larger than 64, then collision will happen absolute certainty.

The available number of CBRA preambles is 64 minus the number of preambles allocated to collision-free random access (CFRA). The available CBRA preambles are further divided into two groups. The grouping allows the UE to signal whether it needs radio resources for a small or large message using one bit. That is, a randomly selected preamble from one group can indicate that the UE has a small amount of data to send, while a preamble selected from another group indicates that resources for a larger amount of data are needed.

The BS continuously monitors PRACH to detect any random access attempts by UEs in its cell. Under normal channel conditions, the BS detects all non-colliding preambles transmitted by UEs and estimates the roundtrip time (RTT) between the BS and each UE from the preamble. The RTT estimation is needed to achieve time synchronization between BS and UE. Sometimes, however, the BS may not correctly receive a UE's random-access preamble transmission due to collision with other preambles or the additive noise or interference on the channel.

Step 2 (Random Access Response (RAR)): The UE receives the RA response in step 2 from the BS that carries the estimated RTT (as timing advance command) as well as the UL grant of resources for the UE to transmit data. The RA response is sent to the UE on a Physical Downlink Shared Access Channel (PDSCH) with other UEs. All UEs that transmitted a RA preamble monitors the shared PDSCH after their preamble transmission to receive their RAR. If the UE does not detect a response within a specified time window, it declares a RA failure and repeats RA transmission using an increased power level. The process continues until the UE receives the RA response, or until a maximum number of attempts is reached, upon which the UE declares failure. Upon a successful response, the UE receives a UL grant that is a location on the UL time/frequency resource grid for transmission.

Step 3 UL Scheduled Transmission: At step 3, the UE is time synchronized with the BS. The UE transmission in this step (referred to also as "message 3") uses the UL PUSCH channel radio resources assigned in step 2. The message 3 is the UE's first scheduled UL transmission. It conveys an actual RRC procedural message with a unique UE ID to be used in contention resolution. In case of a preamble collision at step 1, the colliding UEs will all transmit colliding message 3 (because they all received the RAR that was intended for another UE) that use the same assigned UL time-frequency resources. This may result in interference such that none of the colliding message 3s can be decoded and responded by the BS. The colliding UEs re-start the PRACH procedure by selecting another preamble. However, even if BS can decode at least one UE message 3 successfully, the contention remains unresolved for all other UEs that were using the same preamble at step 1. That is why step 4 below is required.

Step 4: Contention Resolution: At step 4, the MAC downlink message 4 sent by BS in response to message 3 mainly for a quick resolution of contention. The message 4 on the PDSCH is addressed to the unique ID of the UE from which a first successful message 3 is decoded by the BS. The assumption is that this ID allocated to UE by the BS is unique and there is no source of confusion, i.e., all other UEs that sent message 3 and receive message 4 from the BS recognize a different UE ID than that of themselves and understand that a collision happened. In this case, these UEs restart the RA process with another preamble.

Figure 2B:
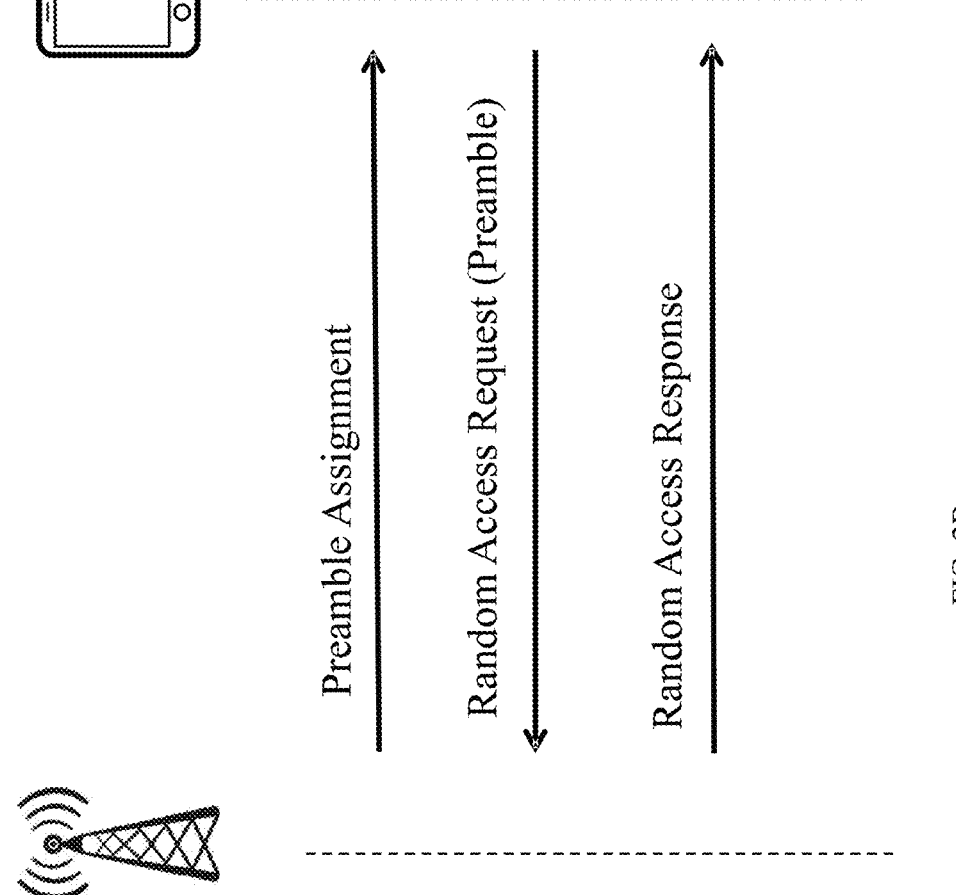

FIG. 2B shows the steps of CFRA process that is used when a network-enforced random access operation is required, such as during a handover or a downlink data arrival with non-synchronized uplink. In step 1, the BS assigns the UE a specific preamble and dictates in which PRACH resource to send it so that there will be no contention involved. The UE sends the RA request message on PRACH in step 2. Then, the BS sends a RAR, which carries the uplink resource grant. Since there is no possibility of contention, there is no need for messages 3 and 4. The RTT between the UE and BS is detected through step 2.

Figure 3A:
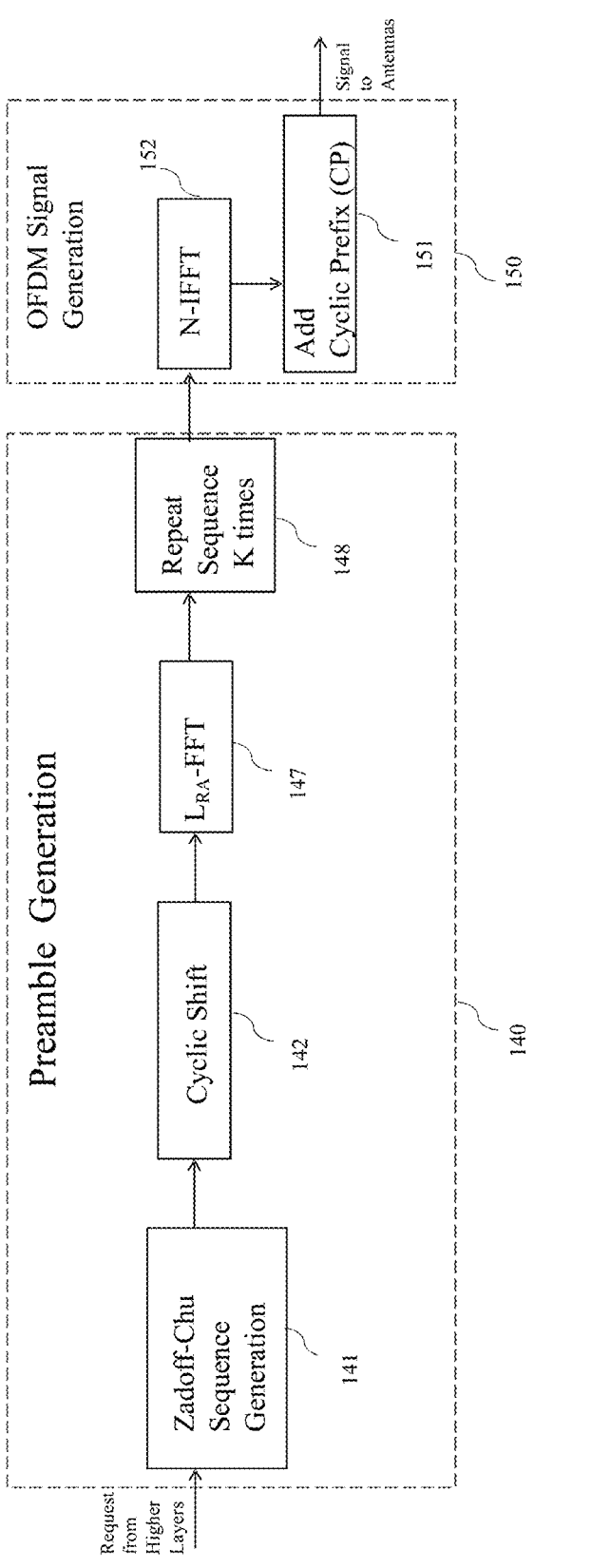
FIG. 3A, 3B Illustrate simple block diagram of the PRACH transmitter and receiver according to prior art.

FIG. 3A depicts a high-level block diagram of a typical prior art PRACH transmitter located in a UE. In box 140, the transmitter in the UE selects one of 64 preamble configurations defined by the root sequence index and cyclic shift. A ZC Sequence of length $L_{RA}$ is created with the root sequence index in box 141, and then cyclically shifted by an amount of selected shift in box 142. This amount of cyclic shift is indeed randomly chosen from all available shifts specified by the BS which creates a random preamble. Generated time domain sequence is then converted to frequency domain by taking the $L_{RA}$ point Fast Fourier transform (FFT) of the signal using $L_{RA}$-FFT block 147. FFT is a simple matrix multiplication that converts time domain samples to frequency domain samples. The obtained sequence is then repeated K times in frequency domain as required by the preamble configuration (see FIG. 1) in box 148. The OFDM modulation is then applied in 150 to the composite frequency domain signal to return it back to time domain before transmission by first taking the N-IFFT block, where $N>L_{RA}$ is defined in 3GPP specifications. The Cyclic Prefix (CP) is then added in 151, and the final radio signal is sent to the transmit antennas.

Figure 3B:
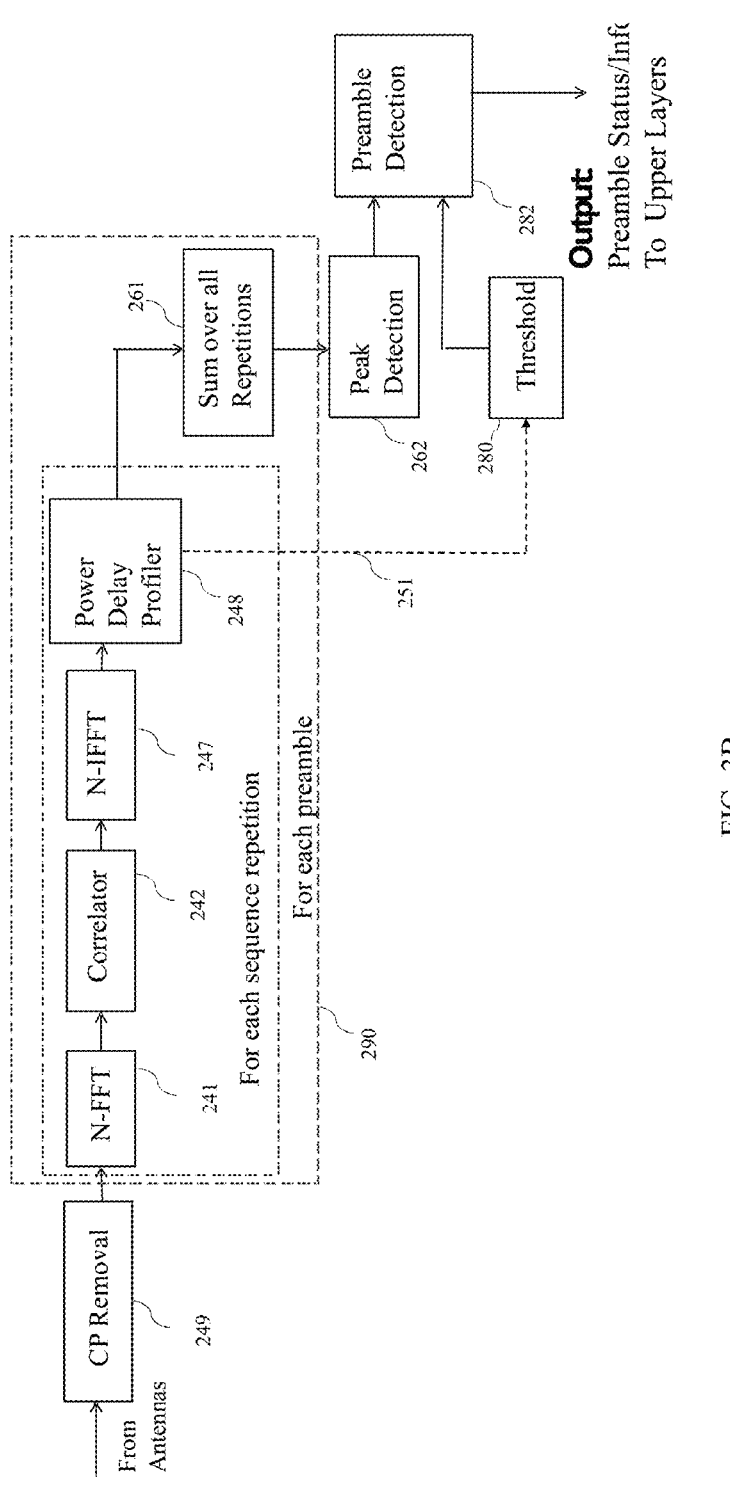

FIG. 3B depicts a high-level block diagram of a prior art PRACH receiver located in the BS. For simplicity, the transmission of single PRACH configuration and reception on a single receive antenna is illustrated. As illustrated in FIG. 3B, the processing at the PRACH receiver begins with CP removal in 249. For all preamble repetition (sequence 0, 1, . . . , K−1 as illustrated in FIG. 1), the OFDM symbols are demodulated through an N point FFT operation converting the time domain preamble signals to frequency domain samples. Now, in frequency domain, Correlator 242 correlates each received preamble sequence (0, 1, 2 . . . , K−1) with locally generated possible preamble candidates (also known as the reference signal). Note that the reference signal is also first converted to frequency domain through the FFT operation followed by conjugation operation (not illustrated in the figure for simplicity). The absolute value of the conjugate multiplication product of the reference and received sequences is then fed into the N-IFFT 247 and element-wise norm squaring which gives the Power Delay Profile (PDP) of the sequence/repetition in process step 248 of the signal in time-domain. The PDP of the preamble is then determined by 261 simply summing up the PDP over all K sequence repetitions. While the peak sample value of the PDP generated in 262 indicates whether a candidate preamble is transmitted or not in comparison to threshold 280 that is preconfigured, all other sample values can also be useful to estimate the channel's noise power level, and later determine an update on the threshold in box 280. The preamble detector 282 simply compares the peak PDP detected in 262 with the preconfigured threshold. It also determines the preamble index and the RTT from the PDP. Reporting this set of information to upper layers concludes preamble detection step of the PRACH receiver operation.

Figure 4A:
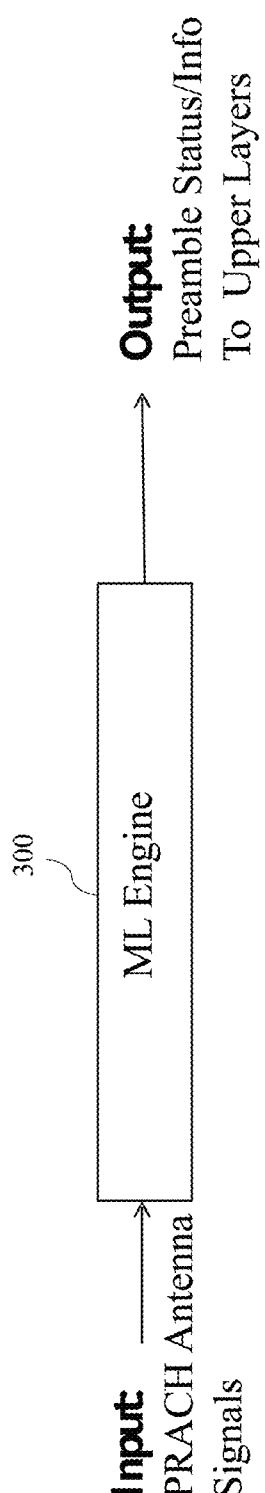
FIG. 4A, 4B, 4C illustrate high-level block diagrams of possible embodiments of the PRACH receiver according to invention.

One possible embodiment of the ML engine is illustrated in FIG. 4A wherein the entire physical layer processing illustrated in FIG. 3B is carried out within a single ML-based processing block. The ML Engine 300 derives the baseband signal samples from antenna signals when it detects a PRACH signal and sends to higher layers the information on whether there is preamble detection or not. Also, the ML engine derives the preamble index and associated timing advance value. While it is possible to feed the antenna signals directly to ML Engine 300 as a single input vector, the antenna signals can also be combined, transformed, or encoded beforehand to get possibly better results. The output may also be encoded to indicate different aspects of the output. The shortcoming of this embodiment is the possible complexity of ML Engine 300 because it undertakes many operations such as FFT, I-FFT and correlation (all are matrix multiplications) that are otherwise performed by readily-available extremely fast special-purpose hardware.

Figure 4B:
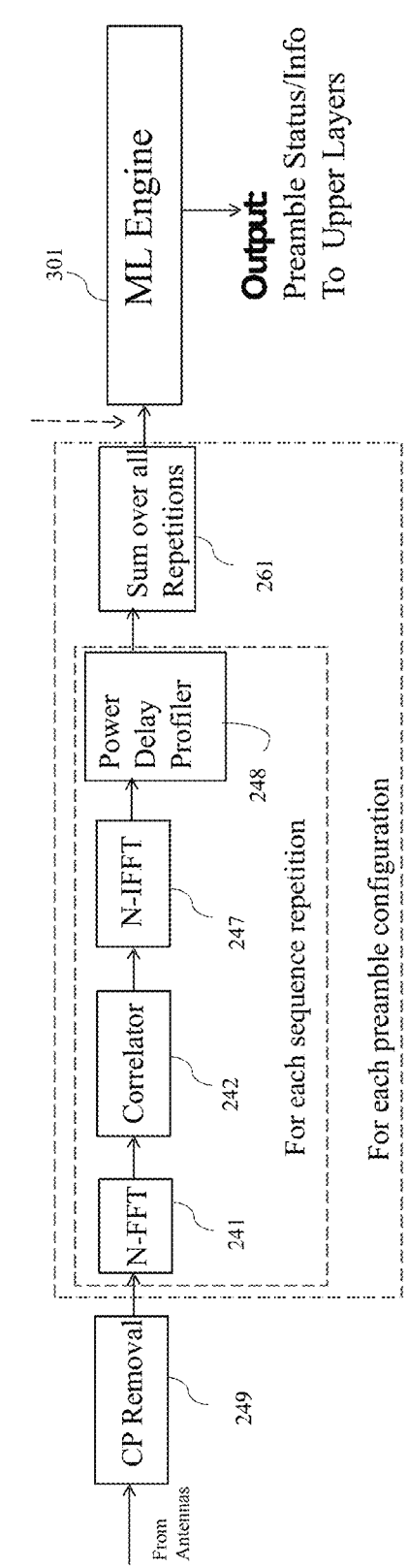

The second possible embodiment of the ML engine is illustrated in FIG. 4B wherein power delay profiles obtained by the correlation of received preamble and reference preambles constitute the input of the ML Engine 301. Note that the input blocks 249, 241, 242, 247, 248 and 261 are the same as the prior art receiver. The input PDP profile of each preamble configuration is fed to ML Engine 301. The ML Engine should be trained earlier with example power delay profiles. The output vector of the ML engine includes at least whether there is a preamble detection (binary value), and if a preamble is detected, the preamble index and associated RTT. The output might also be encoded to indicate other results.

Figure 4C:
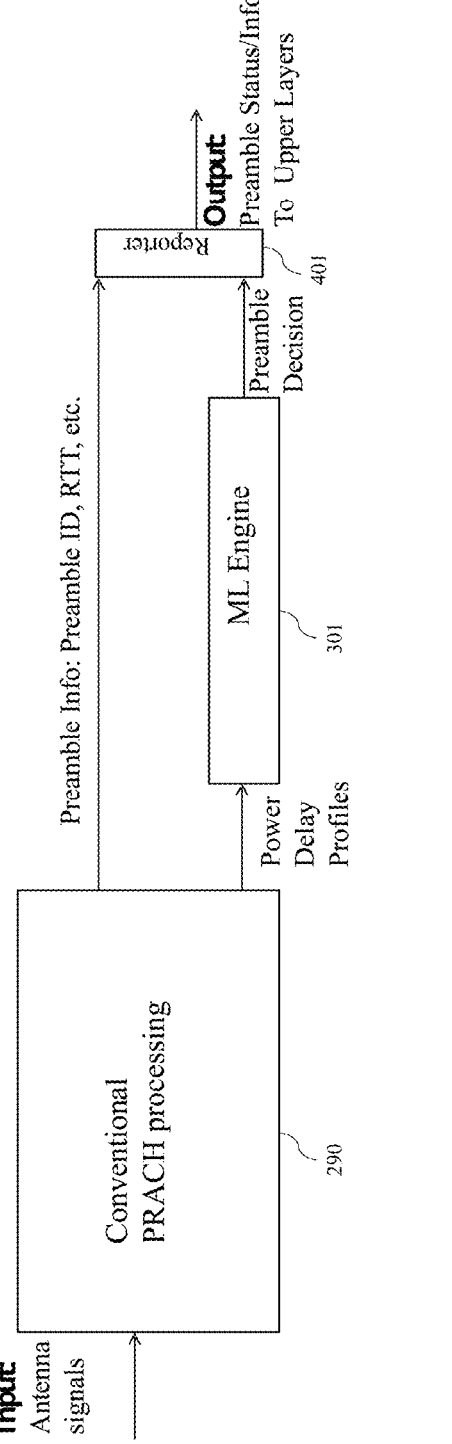

FIG. 4C illustrates yet another possible embodiment of ML Engine 301 that is in combination of the conventional PRACH processing chain which executes all the steps prior to preamble detection as in FIG. 4B but leaves only the preamble detection decision to the ML Engine 301. The Conventional PRACH Processing 290 provides the corresponding preamble index and RTT estimation while ML Engine 301 detects whether there is a preamble or not. Reporter 401 combines the results and reports the result to higher layers such as the MAC layer. This embodiment uses complimentary conventional and ML based approaches.

In yet another embodiment, the combined system of FIG. 4C allows the conventional PRACH chain to detect the presence or absence of a preamble as well as the preamble index and RTT using the threshold approach implemented in the system of FIG. 3B, while ML Engine 301 also detects the presence or absence of a preamble as well as the preamble index. The two results are compared for affirmation by Reporter 401. In this approach, in case of a conflict, the ML based approach may take precedence.

The cases described above does not exhaust all the use cases for ML Engine for preamble detection within a BS receiver. All trivial alternatives including or not including a conventional threshold based system to complement the ML Engine described above and all their extensions are assumed covered by the system and methods of the ML Engine Trainer of this invention.

The ML Engine training is key to the success of ML Engine for preamble detection. The training can be either online or offline. In case of an offline training, the input dataset is stored on a computer outside the base station, and training happens on that computer. The online ML training engine could be either a special hardware implementation such as Application Specific Integrated Circuit (ASIC), and purely software implementation both of which can take place on a component of the base station such as the Central Unit (CU). The hardware implementations of ML Engine and the ML Engine Trainer may be resident on the base station.

Figure 5:
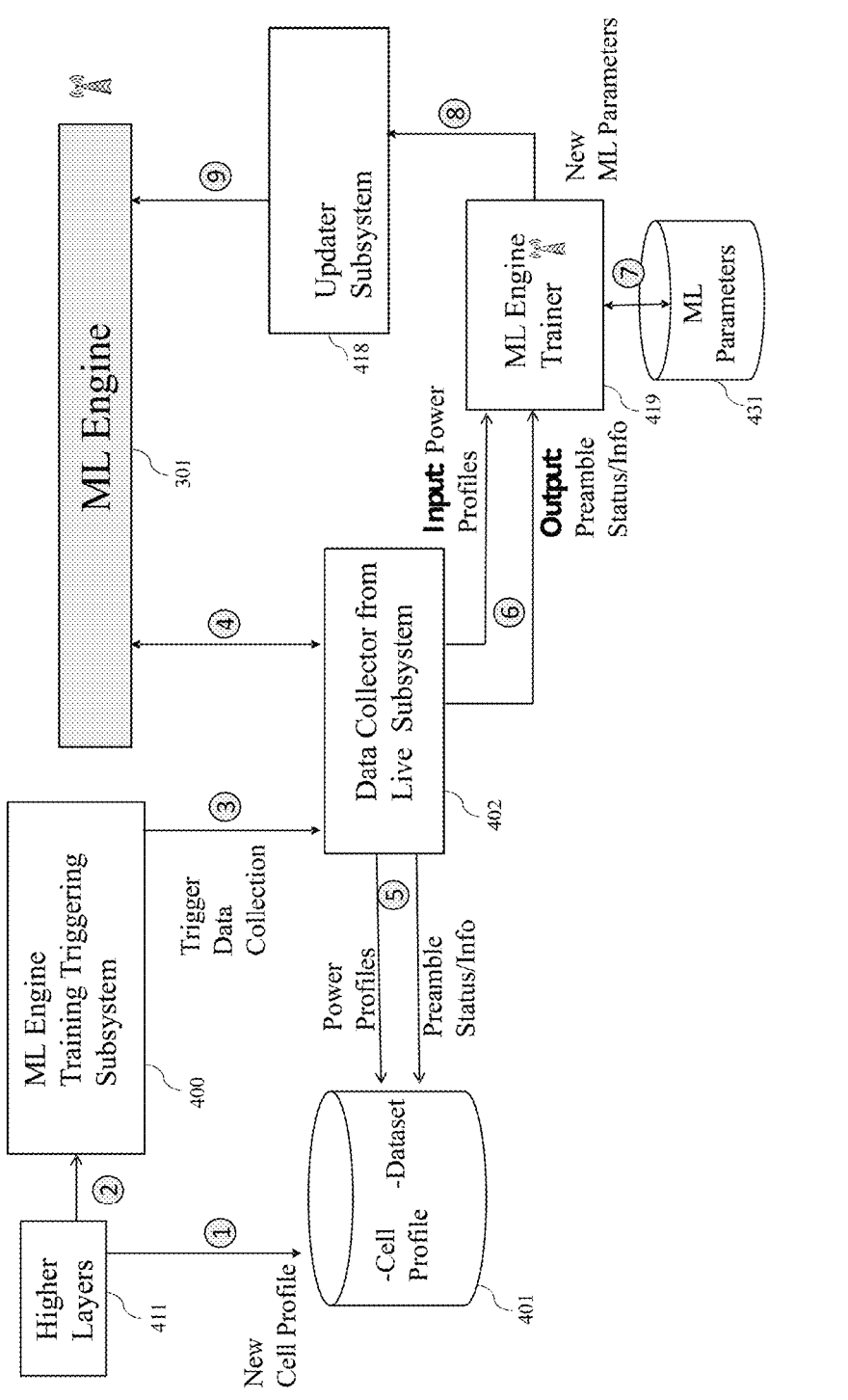
FIG. 5 illustrates a high-level block diagram of the receiver with online ML training system according to invention.

FIG. 5 shows a high-level diagram of the ML Engine Trainer (MLET) 419 and all other peripheral subsystems for coordinated training and update of the parameters of ML Engine 301. In one possible embodiment, each of the peripheral subsystems can be implemented as separate software components. In another embodiment, the peripheral subsystems are integrated into a group of software components. In yet another embodiment, the peripheral subsystems are integrated into MLET 419. MLET 419 and all peripheral subsystems may reside on a component of the BS, or alternatively on a physically separate computer that can receive live data and messages from the BS. ML Engine 301 resides on the BS receiver.

When higher layers 411 collectively decides that a new cycle of training is needed, it sends a request to ML Engine Training Triggering Subsystem (MLETTS) 400. The higher layers make such a decision based on many criteria a few of which can be enumerated as a drastic change in radio access network (RAN) state (e.g., different number and density of UEs, Radio Frequency setting changes, higher channel SNR level), measured excessive RA traffic congestion on PRACH, and explicit messages from UEs indicating PRACH performance decline. If the network state has changed, the new RAN state information is entered into database 401 so that the collected online dataset can be correctly associated. The CBRA UE preamble configuration information such as the root sequence index, cyclic shifts and $L_{RA}$ are also stored associated with network state.

(MLETTS) 400, the key component of this invention, activates live data collection from the input and output of the live ML Engine 301 located on the receiver by sending a request to Data Collector 402 which passively (observationally) collects the data. This process does not impact the functioning of ML Engine 301. Such data collection can be triggered at the initiation of a new training cycle. Alternatively, some recent data can be collected as an ongoing process and readily stored by higher layers. Collected data comprises successful preamble detection information such as ID of the UE initiating a RA request, the detected preamble index, RTT and a time stamp. The collected data is stored in Database 401. Data Collector 402 feeds the data (collected in real-time or stored) into ML Engine Trainer (MLET) 419. Once the MLET 419 determines the new ML Engine parameters, it stores the new parameters into ML Parameters Database 431, and in parallel informs Updater Subsystem 418 about availability of a new update for ML Engine 301. Updater 418 coordinates the transition from old to new parameters. For example, it may take ML Engine 301 offline, replace it with the conventional PRACH processing, update the parameters, test the system using live traffic during a test period, and if the testing succeeds, it may reactivate it. This transition sequence can be implemented in various other ways. These are not enumerated here as it is obvious to one skilled on art. The sequence of steps of ML Engine Training is clearly annotated on the FIG. 5 using numbers from 1 to 9.

Another variation of the ML Training system's operation is to perform so called recursive training wherein the dataset is generated by the BS receiver in real-time and as each new preamble detection data becomes available, the ML engine parameters are updated accordingly. This technique prevents the need to first store substantial amount of ML engine training dataset in Database 401 prior to training.

Figure 6:
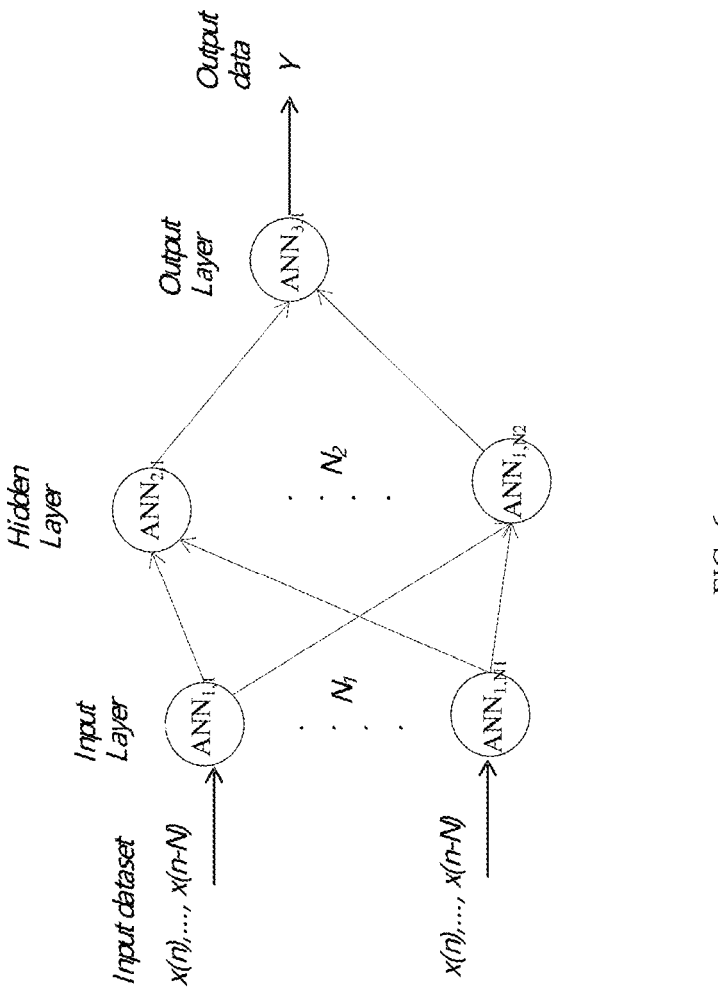
FIG. 6 illustrates a simple configuration of an Artificial Neural Network according to prior art.

A possible embodiment of ML Engine 301 is a simple multi-layer perceptron based Artificial Neural Network (ANN) is depicted in FIG. 6 that has a single input layer, single output layer and a plurality of hidden layers. The input vector of size N is represented by x(n), x(n-1), . . . x(n-N) with N samples. The input samples are, for example, the power delay profiles (PDF) of RA traffic. The nodes (neurons) are distributed to each layer as input nodes, output nodes and hidden layer nodes. Each layer may have different number of nodes. The number of layers and number of nodes in each layer defines the ANN topology.

In FIG. 6, a simple three-layer configuration with an input layer, one hidden layer and an output layer are shown. The input layer has $N_1$ nodes, the hidden layer has $N_2$ nodes, and the output layer has a single node. The ML Engine 301 and the ML Engine Trainer, when converged, must have the same topology. However, the ML Engine Trainer during a new cycle of training process may decide to modify the topology, when the initial/starting topology of the ML Engine 301 does not seem to converge, in which case the ML Engine's topology is also modified according to the new topology to which the ML Engine Trainer converges.

A simple embodiment of an example ANN is illustrated in FIG. 6. Here, each node i performs either a simple linear or non-linear functional operation on the received input sample to generate an output sample, e.g., in case of a more complex non-linear exemplary model: f(Wi x(n)+bi), where W; and b; are weight and bias associated the $i^{th}$ node, f(·) is the non-linear function (e.g., a sigmoid function) and x(n) is the input samples entering the node. Since each node performs the non-linear operation on its received input sample, a cascade of non-linear operations occurs when the input sample traverses through the neural network layer by layer and node by node. When x(n) traverses the three layers through, say, a path comprised of nodes $ANN_{1,i}$, $ANN_{2,k}$ and $ANN_{3,j}$, then the generated contribution of this path to output Y will be $f(W_{3,j} f[W_{2,k}f((W_{1,i} x(n)+b_{1,i})+b_{2,k}]+b_{3,j})$. The value of Y is then determined through summing up contributions of all possible paths on the neural network.

Figure 7:
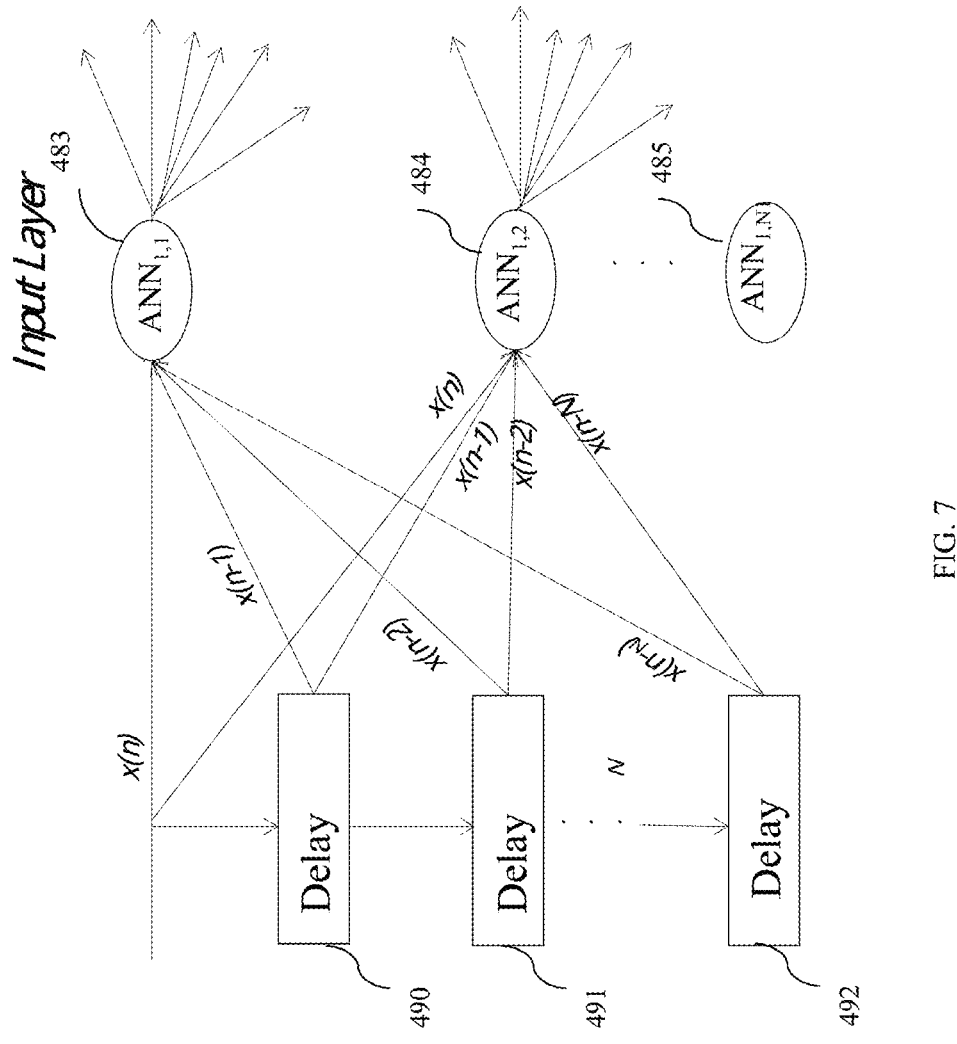
FIG. 7 is an exemplary model of an ANN with delay taps used for memory effects, according to prior art.

In another more complex embodiment of the ANN, the memory effects for a sequence of x(n), n=1, 2, . . . , N are represented as simple delay components in FIG. 7. The first delay component 490 feeds x(n-1) as input to both nodes 483 and 484 of the input layer, second delay component 491 feeds x(n-2) as input, and so on. At node 483, the output sample is determined by using different weights for different delay components, i.e., as $(W11^0 x(n)+W11^1-x(n-1)+ \ldots +W11^N x(n-N)+b_{11})$. Similarly, at node 484, the output sample is $f(W12^0 x(n)+W12^1 x(n-1)+ \ldots +W12^N x(n-N)+b_{12})$. Here $W_{1k}^i$ is layer-1 node-k's parameter for delay input sample x(n-i). Note that FIG. 7 represents a much more complex model wherein each node has a set of weights, as opposed to a single weight, (i.e., a different weight applies to each delay element of the input vector).

The ML training engine is essentially used to optimally determine the weights Wij and biases bij for a chosen linear or non-linear model by using optimization techniques known in prior art (such as Deep Learning) for a given input-output dataset.

Many different training models can be used within ML Trainer 419. For example, Recurrent Neural Network (RNN), another category of ANN, models sequential training input dataset like a time series dataset. The main idea behind RNN is to utilize previous hidden state information as well as current input data element to update the previous state. So, the current state processing also includes the effects of the iterations which have already been performed, Long Short-Term Memory LSTM and Gated Recurrent Unit (GRU) are types of RNN well-known in prior art. However, these methods are capable of learning long term dependencies during the training phase using gates that are different tensor functions that can learn which information to add or remove to/from the hidden state to transfer to the next iteration. ANN/RNN provides a highly useful training model for ML Engine Trainer 419 according to this invention because of the following key reasons:

(i) BS stores preambles through normal CBRA PRACH operations that are correctly detected (undetected preambles, due to collision or noise, or false alarms are normally unbeknown to BS) in memory, which form a time series dataset. Predictions about current state can be made simply using the output of previous iteration. Previous iterations are used as hidden states of the current state. As new data becomes available the iterations continue.

(ii) BS stores preambles through the controlled CFRA PRACH operations according to an aspect of this invention, which form a time series dataset that is labeled as:
a. Correctly detected,
b. Undetected, or
c. False alarm The states in b. and c. are captured only through controlled CFRA PRACH operations. Each trainer-UE may send the CFRA training-preamble once or multiple times during each training cycle upon an instruction from the BS. This process essentially enables the BS to generate a unique dataset. If the UE performs the random access attempt multiple times, each attempt may affect the next attempt.

The ANN can be fed with an input that is a vector of real-numbers, or a vector of complex numbers by feeding the real and imaginary parts as two separate vectors.

Figure 8A:
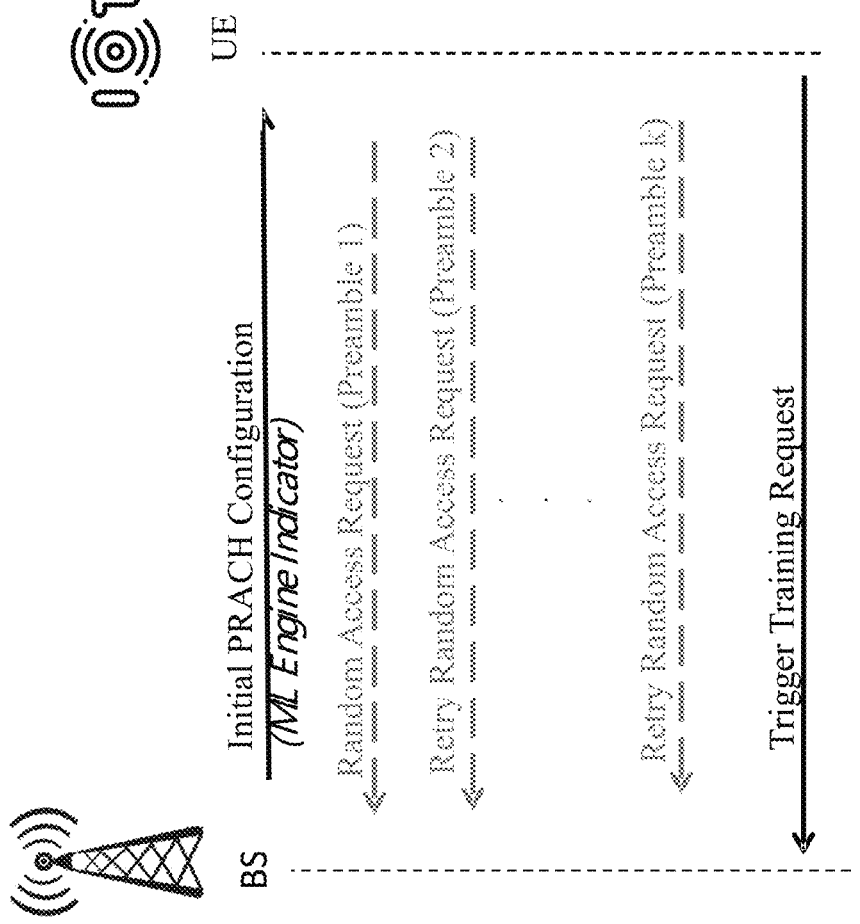
FIG. 8A illustrates first messaging flow between BS and UE according to invention.

FIG. 8A depicts an exemplary messaging sequence between a UE and the BS detect PRACH performance deterioration as perceived by the UEs according to first embodiment of this invention to trigger training. During initial PRACH configuration, the BS sends a few additional configuration parameters to SI that is not currently specified in LTE and 5G standards such as an ML Engine indicator, as an indicator that the BS receiver is using a trainable ML Engine for preamble detection, as well as an optional training CFRA preamble. If the ML Engine Indicator is set to 1, for example, the UE starts paying attention to unsuccessful RA attempts. If a time-out occurs after, say, K successive RA trials, the UE sends an indication of failure by sending a Triggering Training Request message on the downlink control channel to the BS. When the BS receives this message, the higher layers record the sender's UE ID, a time-stamp, and the event. When the number of such events over a configurable time window exceeds a threshold, for example, the higher layers trigger ML engine training cycle. Depending on the different logic that BS uses, many trivial alternatives arise for decision making for triggering a cycle of training by including other data such as cell profile changes, Number of UE changes, SNR and interference measurements becoming a factor for triggering.

The Triggering Training Request Message is a Medium Access Control (MAC) layer message that is sent by the UE addressed to the MAC address of the BS. It can be sent on UL PUSCH or PUCCH like other control messages between the BS and UE.

Figure 8B:
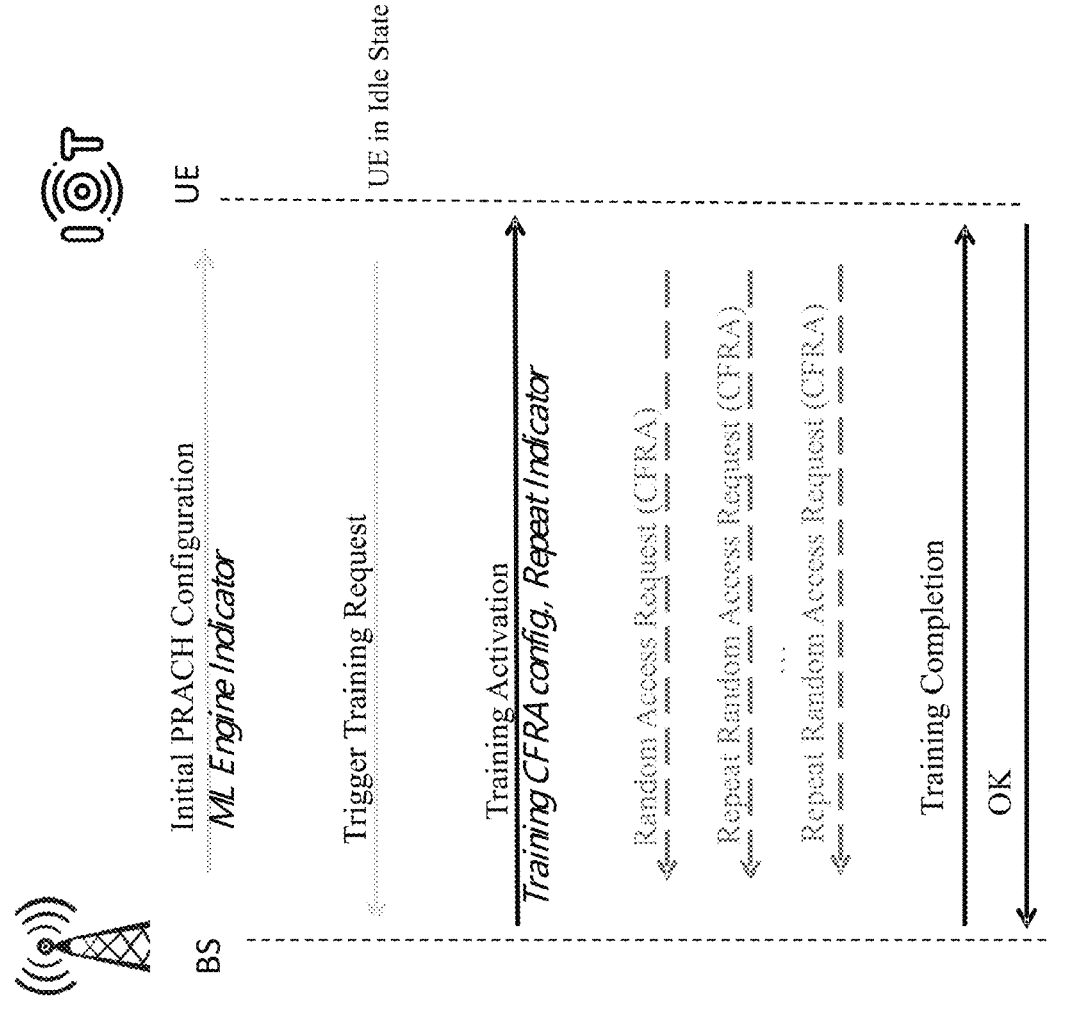
FIG. 8B illustrates second messaging flow between BS and UE according to invention.

FIG. 8B depicts another exemplary messaging sequence between a UE and the BS according to the second embodiment of this invention when the BS decides to trigger an ML training cycle and gather controlled data from the UEs using CFRA preambles. Note that if the RAR is not returned by the receiver in CFRA, it is a direct indication of PRACH congestion since there is no collision to speak of. The BS may decide to set aside a group of CFRA preambles for training purposes only. The controlled data gathering requires an additional message sequence between UE and BS, and a small additional load on UE RA processing. The BS sends a Training Activation message to a trainer-UE. The trainer-UE is a UE in idle state that has or hasn't previously sent a Triggering Training Request message.

The Training Activation Message is a Medium Access Control (MAC) or Radio Resource Control (RRC) layer message that is sent by the BS addressed to the MAC address of the UE. It can be sent on UL PUSCH or PUCCH like other control messages between the BS and UE.

The BS either selects one UE or a small group of UEs as trainer-UEs. The selection is performed such that each selected trainer-UE is normally configured with a different CFRA preamble. If the UE is not originally configured with a training preamble or if the BS wants to override the previously sent training preamble, the BS may send the training preamble configuration to use for the controlled data gathering along with the corresponding PRACH radio resource in the Training Activation message. By optionally assigning the same CFRA to more than one trainer-UE, the BS may attempt to simulate the preamble collision scenario to collect corresponding training data.

Each Training UE may send the CFRA once or multiple times using the specified PRACH radio resource. The Training Activation may also contain an indicator whether the UE must send the CFRA preamble once or multiple times over a time interval. The BS may indicate the UE to stop sending the CFRA preambles at the end of the training cycle by simply sending a Training Completion message. This message may or may not be required depending on whether the repeat times for the CFRA preamble is known by the UE.

After sending the training CFRA preambles the requested number of times, the UE automatically fallbacks to its normal operations.

During the training cycle, if the BS identifies the CFRA preamble from the trainer-UE correctly, it labels the received preamble signal as 'correctly detected'. If the BS identifies a wrong preamble instead or can't detect the preamble, it labels the received preamble as 'undetected'. During the training cycle, the BS listens to a reserved PRACH resource that has no preamble assigned. If it identifies a preamble from a noise signal on this resource, it labels the received signal as 'false alarm'.

The sequence of messaging shown in FIGS. 8A and 8B are only for the purpose of explaining the ML training triggering process according to invention. Trivial modifications, additions, or changes to the messages (name, format, content and sequence) are possible within the framework of UEs directly informing the BS about poor PRACH performance and then partaking in generating a controlled preamble dataset.

Figure 9:
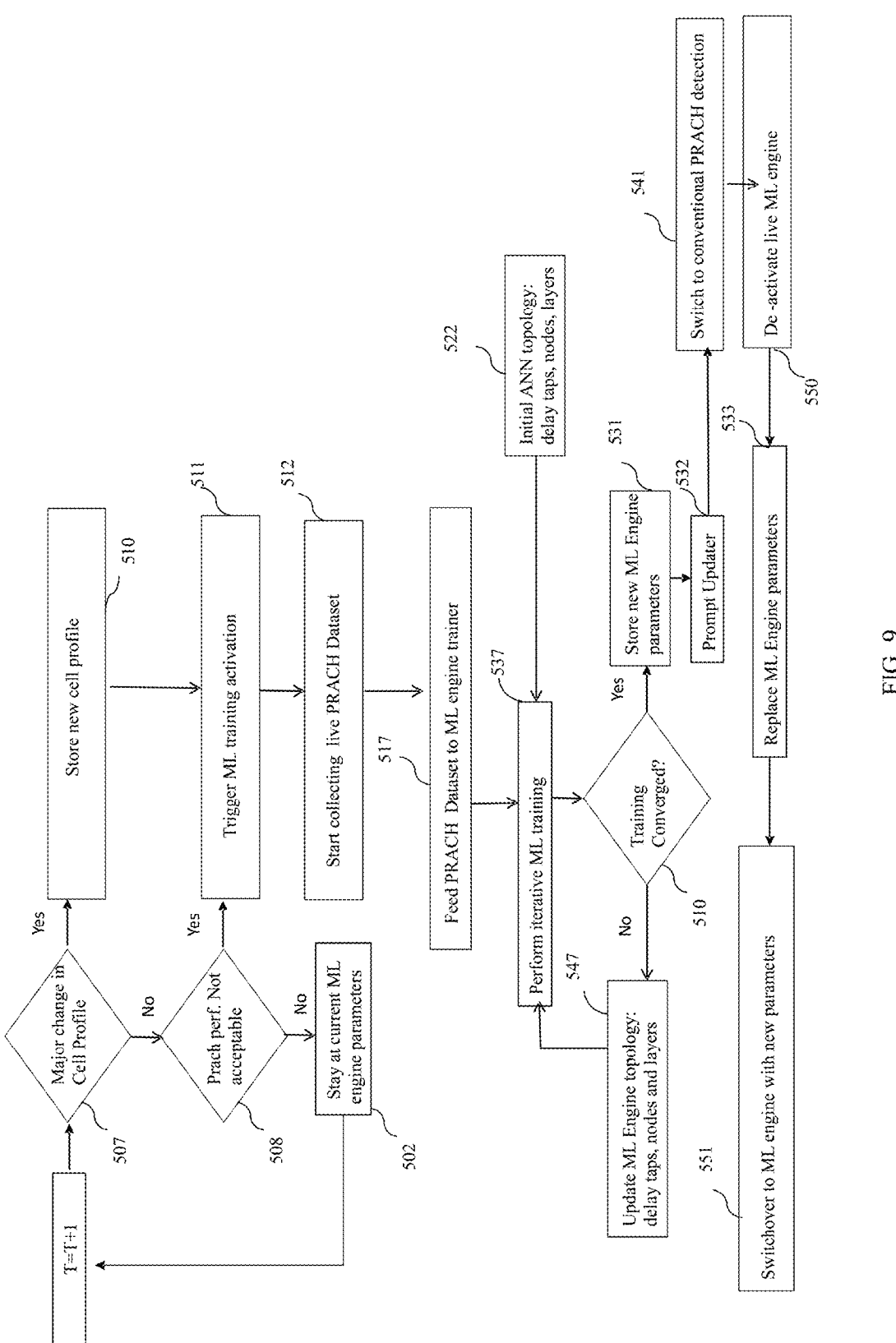
FIG. 9 illustrates a flowchart showing the steps of ML training according to invention.

FIG. 9 depicts exemplary steps of one method of ML Engine training. Step 507 decides if the cell profile has changed. If so, the new profile is stored in the database in step 510. Otherwise, in step 508, it checks to determine if PRACH performance is acceptable based on the number of Triggering Training Request Messages received over a configured time window. If not, the ML training cycle is triggered in step 511 by MLETTS 400. Otherwise, in step 502, the ML Engine parameters stay unchanged. In step 512, the input and output data from normal and/or PRACH traffic are collected through ML Engine 301. The dataset is fed into MLET 419 in step 517. ML training is performed according to one of the ML training methods in step 537 iteratively. The input to the training system is the ANN topology as shown by step 522 if the chosen ML engine is a neural network. The invention doesn't rule out other ML systems. If the training converges according to step 510, the new ML engine parameters are stored in step 531 and Updater System 418 is prompted in step 532. Steps 541, 550, 533 and 551 are the steps for transitioning to the ML engine with the new parameters. If training does not converge according to step 510, the ML engine topology is systematically updated in step 547 and ML training is repeated until convergence.

Figure 10:
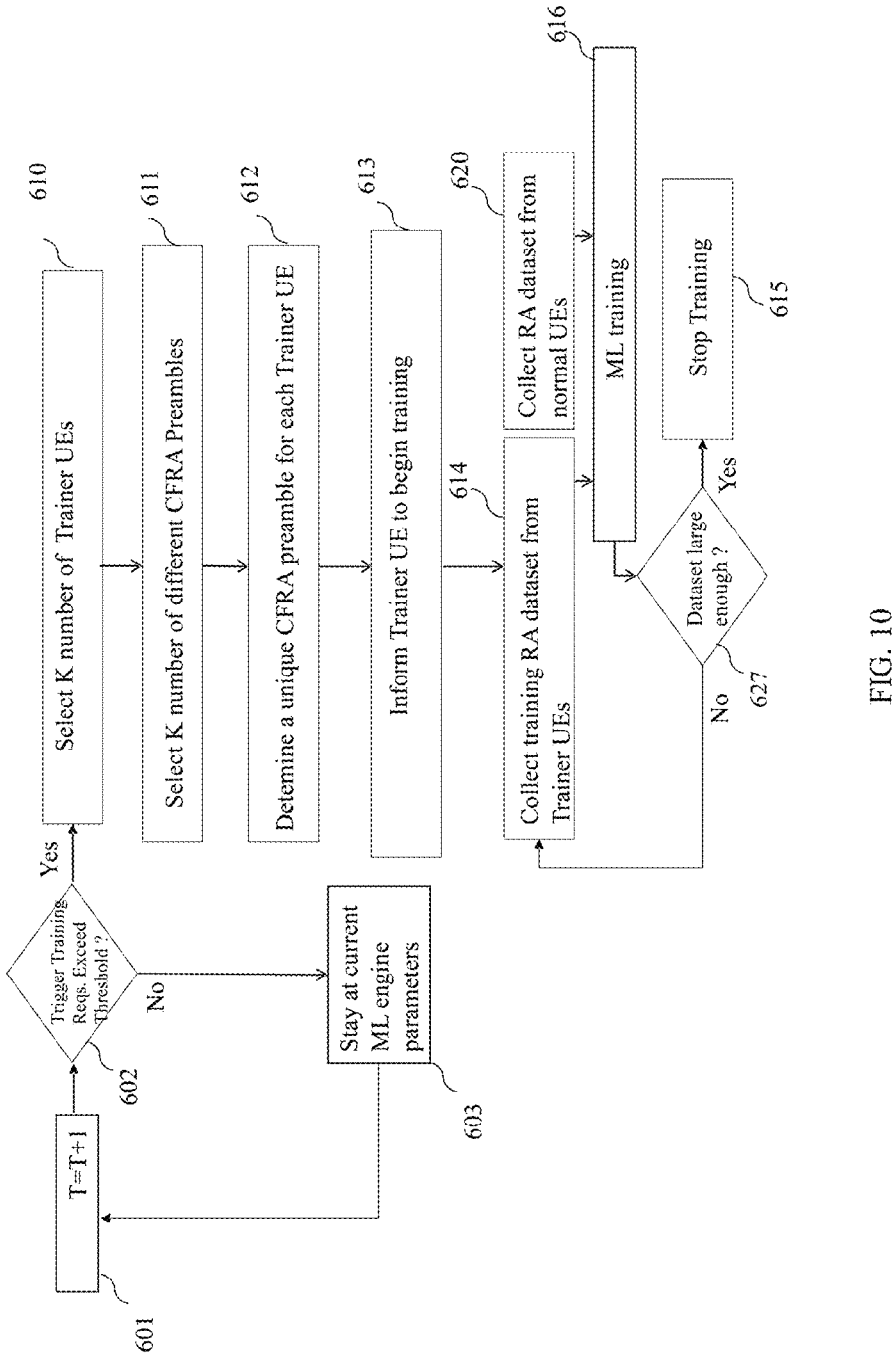
FIG. 10 illustrates a flowchart showing the steps of triggering according to invention.

FIG. 10 depicts exemplary steps of a method of ML Engine Training Triggering Subsystem (MLETTS) 400. In step 602, it checks to determine if the number of Trigger Training Requests from UEs exceeds a threshold over a time window. If not, in step 603, the ML engine stays at current ML engine parameters and continues to monitor by returning to step 601. Otherwise, in step 610, it selects K≥1 number of trainer-UEs from those reporting UEs that are in idle state. In step 611, it selects K number of unique CFRA configurations and the corresponding PRACH resource for each CFRA and assigns a unique CFRA to each trainer-UE in step 612. In step 613, the BS sends a Training Activation to each trainer-UE. The UE may be readily configured with the training CFRA. Alternatively, the MLETTS 400 may send it within the Training Activation message. In step 614, training dataset is collected from the trainer-UEs. At step 616, ML engine training is recursively performed as data arrives from trainer-UEs. In step 627, the system checks to determine if the dataset is large enough. If not, the process returns to step 614. Otherwise, BS informs the trainer-UEs to stop training and resume normal operations. Alternatively, trainer-UEs may automatically resume normal operations after repeating CFRA a specified number of times. ML training in step 616 uses both controlled preamble detection dataset generated in step 614 as well as CBRA preamble detection dataset gathered by the ML engine through normal RA operations.

One or more of the components illustrated in these Figures can be implemented in specialized circuitry configured to perform the noted functions or one or more of the components can be implemented by one or more processors executing instructions to perform the noted functions. Other embodiments are used without departing from the scope of the present disclosure.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations such as FFT/IFFT and modulation/demodulation operations can be performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

What is claimed is:

1. A method for triggering training of a machine learning engine, the machine learning engine being deployed within a receiver subsystem of a base station of a radio access network (RAN), the method comprising:

receiving, at the base station, random access preamble signals or processed versions thereof over a Physical Random Access Channel (PRACH) from a plurality of user equipment (UEs);

determining, by the receiver subsystem, whether a preamble is present in the received signals;

receiving, at the base station, from each of a plurality of UEs, a lightweight message indicating that a random access attempt over PRACH has failed, wherein the message is not a log file or detailed report but a direct indication of failure;

in response to receiving the lightweight messages from at least a threshold number of UEs within a predetermined time window, triggering, by a machine learning engine trainer that is physically and functionally distinct from the receiver subsystem, a new training cycle for the machine learning engine, the training cycle including collection of both normal and controlled random access preamble detection data.

2. The method of claim 1, further comprising:

using, as part of the trigger for the new training cycle, measurements collected by the base station on at least one of: cell profile, signal-to-noise ratio (SNR), interference, and other PRACH performance indicators, in combination with the received lightweight messages from the UEs.

3. The method of claim 1, wherein the triggering of the new training cycle is performed when the number of UEs sending the lightweight message indicating PRACH random access failure exceeds a configurable threshold within a predetermined time window.

4. The method of claim 1, wherein the decision to trigger the new training cycle is determined by an output of a recurrent neural network (RNN) that takes, as input, the pattern and timing of the received lightweight messages from the UEs.

5. The method of claim 1, further comprising:

selecting, by the base station, a group of UEs from among those that sent the lightweight message, as trainer-UEs;

generating and transmitting, by the base station, a configuration message to each trainer-UE, the configuration message including a contention-free random access (CFRA) configuration and a PRACH radio resource to be used exclusively for training data collection;

receiving, at the base station, CFRA preamble transmissions from the trainer-UEs, the transmissions being performed solely for the purpose of generating a controlled training dataset for the machine learning engine.

6. The method of claim 5, wherein each trainer-UE is assigned a different CFRA configuration.

7. The method of claim 5, wherein the group of trainer-UEs is assigned the same CFRA configuration.

8. The method of claim 5, wherein the group of trainer-UEs is selected from the UEs that sent the lightweight message indicating PRACH random access failure.

9. The method of claim 5, wherein the group of trainer-UEs is selected from UEs that are in an idle state at the time of selection.

10. The method of claim 5, wherein the CFRA configuration is sent to the trainer-UE in its initial random access configuration.

11. The method of claim 5, wherein the CFRA configuration is sent to the trainer-UE after the UE has been assigned as a trainer-UE.

12. The method of claim 5, wherein the configuration message sent to each trainer-UE specifies a number of times the CFRA preamble must be transmitted for training purposes.

13. The method of claim 5, further comprising: transmitting, by the base station, a message to the trainer-UE to stop sending training CFRA preambles and to resume normal operation.

14. The method of claim 5, wherein the training cycle produces a controlled training dataset comprising, for each data entry: a training CFRA preamble signal or a processed version thereof, received by the machine learning engine, and a label indicating whether the preamble was correctly identified, undetected, or resulted in a false alarm, based on preamble detection status.

15. A trainer system for a machine learning engine, the trainer system being deployed within a base station of a radio access network (RAN), the trainer system comprising:

a triggering subsystem, physically and functionally distinct from the receiver subsystem, configured to trigger a new training cycle for the machine learning engine in response to receiving, from a plurality of UEs, lightweight messages directly indicating PRACH random access failure, and further configured to use both controlled and normal random access preamble detection datasets for training;

a data collection subsystem configured to collect and store random access preamble detection data, including data from controlled CFRA transmissions by trainer-UEs selected from UEs that sent the lightweight message;

a machine learning engine trainer configured to generate new optimal machine learning engine parameters using the collected random access preamble detection data and a neural network topology;

an updater subsystem configured to update the machine learning engine parameters according to the new parameters determined through training.

* * * * *